June 8, 1965  D. LAWS  3,187,376
FISH-DRESSING MACHINES
Filed June 3, 1963  2 Sheets-Sheet 1
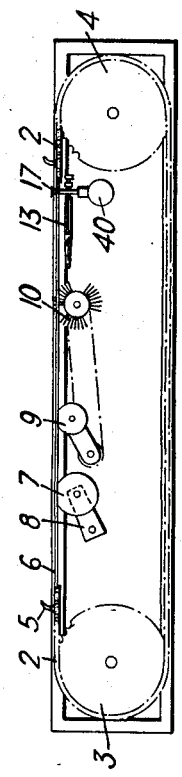
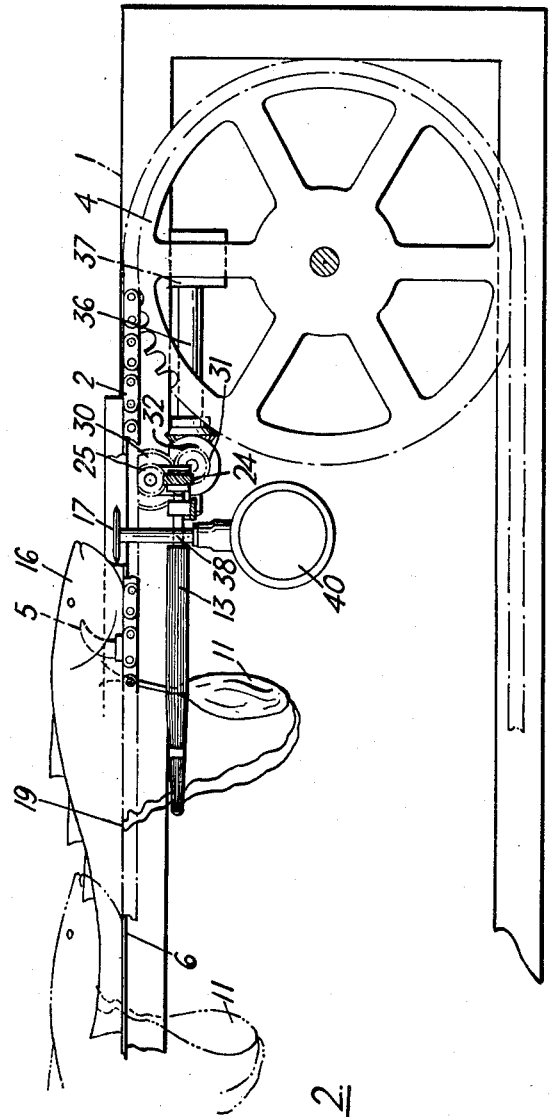
Inventor
DENNIS LAWS
By
Holcombe, Wetherill + Brisebois
Attorneys

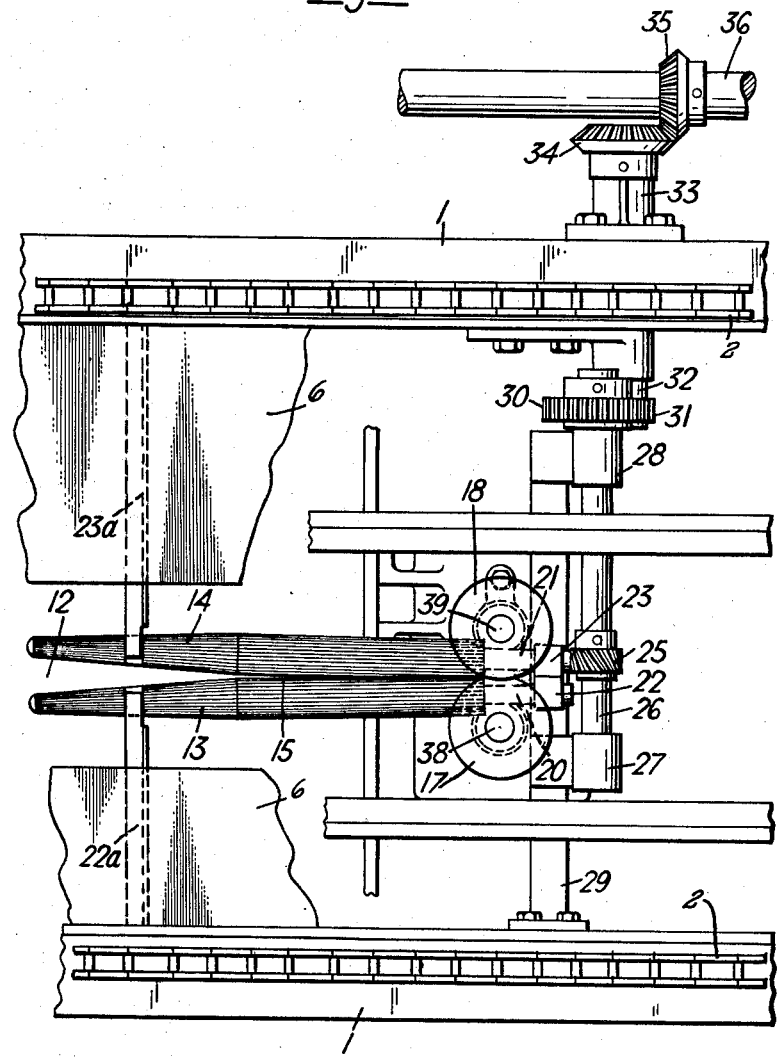

3,187,376
FISH-DRESSING MACHINES
Dennis Laws, Hull, England, assignor to Fisadco Limited,
London, England, a British company
Filed June 3, 1963, Ser. No. 284,917
Claims priority, application Great Britain, June 15, 1962,
23,151/62
3 Claims. (Cl. 17—3)

In the mechanical gutting of fish, for example cod, one of the difficulties is to sever the guts completely from the body of the fish without damaging the valuable parts of the fish. In the main the guts of a fish are attached to the body at only two points, the throat and the vent, although there are two additional points of attachment between the two parts of the liver and the upper part of the wall of the belly cavity. In one gutting machine, an example of which is described in British Patent No. 880,394, accepted August 17, 1961, the fish is conveyed belly downwards and, whilst it is being conveyed in this way, a knife cuts through the belly to open the belly cavity. A device then dislodges the guts from the belly cavity so that they are suspended from the fish between the throat and vent. Subsequently the guts are severed at the throat and finally at the vent also. It has, however, been found that these last two cuts, particularly that at the throat, cannot always be made satisfactorily with the guts hanging freely because the knife tends to slip along the guts before they are severed so that a short length of gut is left attached at the throat end.

According to the present invention, we provide, below the path along which the fish is conveyed, two co-operating members having moving surfaces which form between them a nip into which the suspended gut moves and is gripped so that it is pulled away from the fish and held under tension whilst the guts are severed at the throat.

The members preferably consist of a pair of elongated rollers which extend with their axes along, but below the path of the fish. These rollers form a nip between them and have a driving mechanism by which they are rotated in directions such that their surfaces at the nip move downwards away from the path of the fish. The rollers are preferably shaped so that there is a tapering entry to the nip in the direction of motion of the fish. The surface may be ribbed and grooved and mesh with each other to improve the grip of the rollers on the slippery surface of the gut.

As soon as the gut is gripped in the nip between the rollers, it is pulled downwards as is a bit of washing between the rollers of a mangle. The speed of rotation of the rollers is adjusted relative to the speed of conveyance of the fish past them and hence relative to the time for which the guts are gripped between them, to obtain the right tension on the gut before cutting.

An example of a fish gutting machine constructed in accordance with the invention is illustrated in the accompanying drawings, in which:

FIGURE 1 is a diagrammatic side elevation of the machine;

FIGURE 2 is a side elevation to a larger scale of a part of the machine shown in FIGURE 1; and FIGURE 3 is a plan to a still larger scale of part of the machine shown in FIGURE 2 with a portion of the plate 6 broken away so that the rollers 13 and 14 may be seen.

The machine comprises a frame 1 which carries an endless conveyor formed by a pair of chains 2 side by side and passing around sprockets 3 and 4. Each chain 2 has hooks 5 fixed to it at intervals and a pair of these hooks, one on each chain, engage in the gills of a fish and convey it along a plate 6 in a manner described in detail in British Patent No. 878,957 complete specification published October 4, 1961.

As the fish is conveyed in this way belly downwards, first of all, its belly is slit open by a rotating disc knife 7 mounted on an arm 8. The knife 7 swings upward on the arm 8 and then swings downwards again as the cut reaches the rear end of the belly cavity. The slit made by the knife 7 divides the belly of a fish into two flaps and a rotating knife assembly 9 is swung upwards and on a pivoted arm between these belly flaps to sever the livers within the belly cavity. Next, the guts in the belly cavity are struck by a rotating brush 10 and this dislodges the guts from their intermediate points of attachment within the belly cavity so that the guts hang down as indicated in FIGURE 2 of the drawings, being suspended from a point of attachment at the throat of the fish and the second point of attachment at the vent.

At this stage of its passage through the gutting machine, the fish reaches the part of the machine illustrated in detail in FIGURES 2 and 3 of the drawings. As the guts 11 hang through a slot in the plate 6, they move into a tapering entry 12 between a pair of rotating rollers 13 and 14. These rollers have their surfaces formed with a series of axial ridges and grooves of small depth and these ridges and grooves mesh with each other as the rollers rotate. As viewed from the right hand side of FIGURE 3, the roller 13 rotates in a clockwise sense and the roller 14 rotates in a counterclockwise sense so that the surfaces of the rollers move downwards at the nip 15 formed between them. The ridges on the rollers 13 and 14 grip the guts 11 and drag them downwards forcing the body of the fish 16 downwards onto the plate 6. This holds the guts 11 taut and while they are held taut in this fashion, they move between a pair of contra-rotating disc knives 17 and 18 which sever them close to the throat of the fish. Subsequently the rear end of the guts 11 at the vent 19 passes between the knives 17 and 18 so that the guts are completely severed from the fish and fall down out of the machine.

As is shown most clearly in FIGURES 2 and 3 of the drawings, the rollers 13 and 14 are mounted on shafts 20 and 21 respectively which are in turn held in bearings 22 and 23. The rollers are additionally supported in bearings on the ends of brackets 22a and 23a extending from the frame 1. The shaft 21 extends right through the bearing 23 and on its end remote from the roller 14 it carries a skew gear 24 (FIG. 2) which meshes with a further skew gear 25 (FIG. 3) on a driving shaft 26. The roller 13 is driven by the roller 14 through the meshing of the ridges and grooves.

The driving shaft 26 is mounted in bearings 27 and 28 carried by a bracket 29 which is bolted to the main frame 1 and on its end it carries a pinion 30 which meshes with a further pinion 31 on a lay shaft 32 carried in a bearing 33. The lay shaft 32 is in turn driven by a bevel gear 34 which meshes with a bevel gear 35 on a shaft 36. The shaft 36 is driven from a gear box 37 indicated in FIGURE 2 of the drawings and this in turn is driven from the main conveyor sprocket 4.

The disc knives 17 and 18 are carried on vertical shafts 38 and 39 respectively and these are driven by gearing within a housing 40 which is in turn driven from the shaft of the main conveyor sprocket 4 by a transmission which is not shown.

I claim:
1. In a fish gutting machine comprising means for conveying a fish in a direction along its length and with its belly downward, a knife for cutting open the belly cavity, a device for dislodging the guts so that they are suspended from the fish between the throat and vent, and a knife for cutting the gut at the throat and vent, said belly cutting knife, guts dislodging device and gut cutting knife being positioned in that order along the path of travel of said conveying means, the improvement comprising a pair of rollers disposed below said path of travel and forming a nip between them, said rollers being elongated with their axes of rotation extending parallel to said path of travel whereby the gut of the fish travels along the nip between the rollers, and means for rotating said rollers inwardly toward said nip whereby said gut is progressively tensioned and stretched but left attached to said fish as it travels along said nip until it encounters and is cut at the throat and vent by said gut cutting knife, while held in said tensioned condition.

2. A machine as claimed in claim 1 in which the rollers define a tapering entry to the nip in the direction of motion of the fish.

3. A machine as claimed in claim 1 in which the means for conveying the fish comprises an endless chain having hooks for gripping the fish at intervals, and two sprockets around which said chain passes, one of said sprockets being positively driven and the rollers being driven through one of said sprockets.

References Cited by the Examiner

UNITED STATES PATENTS

| 1,202,627 | 10/16 | Weber et al | 17—3 |
| 2,169,791 | 8/39 | Danielson | 17—3 |

FOREIGN PATENTS

| 60,863 | 7/54 | France. |
| 880,176 | 10/61 | Great Britain. |
| 119,476 | 8/47 | Sweden. |

SAMUEL KOREN, *Primary Examiner.*

LUCIE H. LAUDENSLAGER, *Examiner.*